US010305912B2

(12) United States Patent
Diestler et al.

(10) Patent No.: US 10,305,912 B2
(45) Date of Patent: May 28, 2019

(54) METHODS OF ENABLING INTER-ORGANIZATIONAL AND PUBLIC SOCIAL COLLABORATION

(71) Applicant: Smart Social Media, Inc., Huntsville, TX (US)

(72) Inventors: Scott Diestler, Cottage Grove, MN (US); Kirk Schloegel, Minneapolis, MN (US); Doug Shimonek, New Brighton, MN (US); Leo Bartkus, Golden Valley, MN (US); Dave Carley, Las Vegas, NV (US); Erik Arthur, Woodbury, MN (US)

(73) Assignee: Smart Social Media, Inc., Huntsville, TX (US)

( * ) Notice: Subject to any disclaimer, the term of this patent is extended or adjusted under 35 U.S.C. 154(b) by 362 days.

(21) Appl. No.: 15/045,719

(22) Filed: Feb. 17, 2016

(65) Prior Publication Data

US 2016/0255089 A1 Sep. 1, 2016

Related U.S. Application Data

(60) Provisional application No. 62/120,970, filed on Feb. 26, 2015.

(51) Int. Cl.
*H04L 29/06* (2006.01)
*G06F 21/62* (2013.01)

(52) U.S. Cl.
CPC ........ *H04L 63/102* (2013.01); *G06F 21/6236* (2013.01)

(58) Field of Classification Search
CPC .......... G06F 21/30; G06F 21/31; G06F 21/41; G06F 21/6236; G06F 21/6263;
(Continued)

(56) References Cited

U.S. PATENT DOCUMENTS

2012/0110087 A1* 5/2012 Culver ............... G06F 17/5004
709/205
2013/0191418 A1* 7/2013 Martin, Jr. ........ G06F 17/30569
707/802
(Continued)

OTHER PUBLICATIONS

"Microsoft Account," Wikipedia, the free encyclopedia, http://en.wikipedia.org/wiki/Microsoft_account.

*Primary Examiner* — Joseph P Hirl
*Assistant Examiner* — Chi D Nguy
(74) *Attorney, Agent, or Firm* — DLA Piper LLP (US)

(57) ABSTRACT

Systems and methods for controlling access to electronic collaboration content data associated with a plurality of organizations. The system includes one or more databases storing the electronic collaboration content data. An identity aggregator receives a request for access to the electronic collaboration content data from an individual's client device and determines an internal user identifier of the individual, that represents an aggregate identity of the individual corresponding to at least one of organizational identities or external identities. A content access manager maps the internal user identifier to content permissions associated with the individual across each organization that is associated with the individual and the external content services associated with the individual. The content access manager permits access by the client device to at least a portion of the electronic data stored among the databases across each organization associated with the individual and based on the individual's content permissions.

22 Claims, 15 Drawing Sheets

(58) Field of Classification Search
CPC ..... H04L 63/02; H04L 63/101; H04L 63/102; H04L 63/104
See application file for complete search history.

(56) References Cited

U.S. PATENT DOCUMENTS

| | | | |
|---|---|---|---|
| 2014/0019880 A1* | 1/2014 | Kucera | H04L 65/403 715/753 |
| 2014/0071967 A1* | 3/2014 | Velasco | H04L 12/1403 370/338 |
| 2014/0082715 A1* | 3/2014 | Grajek | H04L 63/083 726/8 |
| 2014/0122870 A1* | 5/2014 | Gupta | H04L 63/0823 713/156 |
| 2015/0006708 A1* | 1/2015 | Banke | H04L 67/22 709/224 |
| 2015/0134693 A1* | 5/2015 | Chan | H04L 65/403 707/769 |

\* cited by examiner

Community Information

● Information      Properties      Followers      Administrators

Community Name

[ Community Name ]

The community's name is required

Community Description

[ Short description of community ]

Community Image

[ Choose ] OR Drag and Drop here

Only PNG, GIF, JPG, and JPEG files are allowed.

Basic information about your community

The community name is how your community will be shown in directories and searches The community description is a brief paragraph about your community. It tells users more about the focus of the community.

Finally the community image is the picture that users will see representing your community

[ Information ]

[ Cancel ]    [ Next ]

FIG. 8A

METHODS OF ENABLING INTER-ORGANIZATIONAL AND PUBLIC SOCIAL COLLABORATION

TECHNICAL FIELD

The present disclosure relates generally to systems and methods for social network collaboration and, in particular, to a social network collaboration platform that enables simultaneous inter-organizational and intra-organizational collaboration, and that facilitates private and public conversations.

BACKGROUND

Effective social network collaboration in complex networked environments may be challenging. Collaboration may include communication across hierarchical levels of an organization as well as across organizational boundaries. However, the amount of communications produced by even a single organization may be intractable for an individual or even a team to manage. The problem may be exacerbated when individuals from multiple organizations collaborate. Thus, communications may be filtered in order for the communications to support effective collaborations.

Effective collaboration may also depend upon a limited circle of contributors that are able to access and produce shared content. Some members of a collaboration circle may be part of the same organization. However, generally, collaboration circles may span multiple organizations and/or different hierarchy levels.

Organizations typically rely upon stand-alone (i.e., siloed) networks to support collaboration of their members. However, stand-alone networks intrinsically limit communication. In practice, to work around this limitation, only some collaboration occurs in these stand-alone systems. Instead, much of the communication occurs through other mediums such as emails, phone calls, and other messaging platforms. The value of the collaboration that takes place in this ad-hoc fashion may be vastly diminished, because the artifacts of the collaboration may not be coherent, archived, or searchable. Furthermore, access to this content may not be easily managed by the collaborating organizations.

There is a need for systems capable of managing content access and sharing across organizations, while still protecting the content from unauthorized access. There is also a need for systems capable of providing searchable content and ongoing collaboration artifacts to the appropriate individuals in a collaboration circle.

SUMMARY

Aspects of the present disclosure relate to systems, methods and non-transitory computer-readable storage media for controlling access to electronic collaboration content data associated with a plurality of organizations that each separately support social network collaboration. The system includes a collaboration platform having an identity aggregator, a content access manager and one or more databases configured to store the electronic collaboration content data associated with the plurality of organizations. The identity aggregator is configured to receive an electronic request for access to the electronic collaboration content data from a client device of an individual over a communication network, and to determine an internal user identifier of the individual responsive to the electronic request. The internal user identifier represents an aggregate identity of the individual corresponding to one or more organizational identities of the individual among the plurality of organizations and/or one or more external identities of the individual among one or more external content services. The content access manager is configured to map the internal user identifier of the individual to content permissions associated with the individual across each organization among the plurality of organizations that is associated with the individual and the one or more external content services associated with the individual. The content access manager permits, by the client device, over the communication network, access to at least a portion of the electronic collaboration content data stored among the one or more databases across each organization associated with the individual and based on the content permissions of the individual.

BRIEF DESCRIPTION OF DRAWINGS

FIGS. 8A, 8B, 8C and 8D are example screenshot images of a graphical user interface on a client device for creating and managing a virtual community using the collaboration system shown in FIG. 1, according to an aspect of the present disclosure.

DETAILED DESCRIPTION

Figure 1:
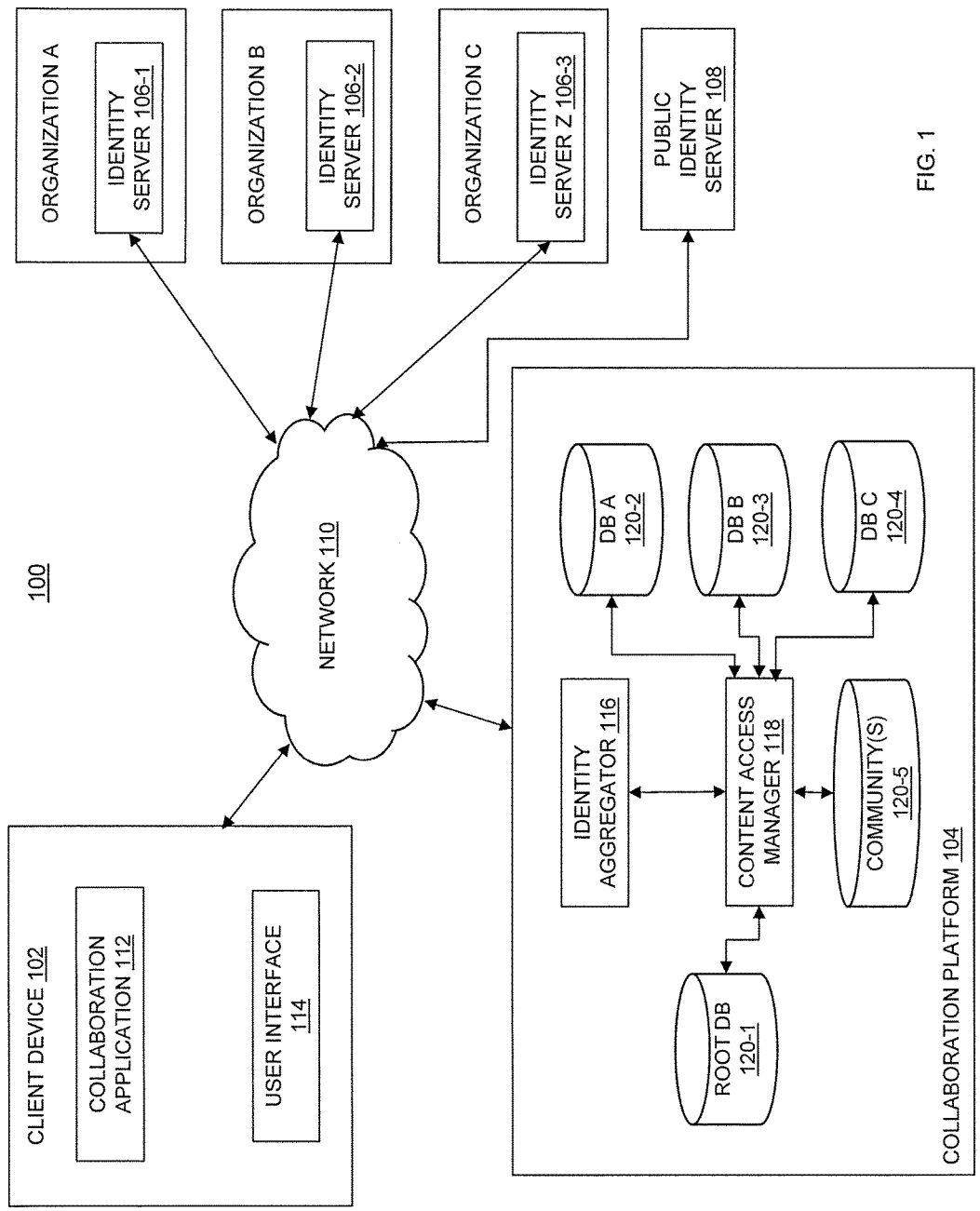
FIG. 1 is a functional block diagram of an example social network collaboration system, according to an aspect of the present disclosure.

Current social network collaboration platforms may either be public platforms, or may be private platforms that are isolated and do not allow for both intra- and inter-organizational collaboration within the same context. In general, a public platform is open to members and non-members (e.g., non-members can view the members, can join them, follow them and/or post content). A private platform is only open to members (i.e., non-members do not have access to the platform). With current collaboration platforms, a user typically accesses separate systems and maintains separate identities. For example, a user may access an organization's private platform to collaborate with coworkers and may separately access a public content service (e.g., LinkedIn™) to collaborate with peers outside of the user's organization. Because, the user accesses separate systems with different identities, the content for collaboration and the artifacts of collaboration may either be redundantly copied between these systems (i.e., the private and public platforms) or may become lost.

Assume that users associated with organizations A and B would like to collaborate on a particular task. It may be desirable for organizations A and B to jointly manage the artifacts of this collaboration (i.e., content). It may also be desirable for organizations A and B to maintain their distinct identities and branding so that collaborator members of their respective organizations interact with familiar uniform resource locators (URLs), palettes, symbols, icons, etc. on their respective user interfaces.

Aspects of the present disclosure relate to methods and systems for enabling and facilitating inter-organizational and intra-organizational networked collaboration, through a mechanism of shared content. Example methods and systems of the present disclosure may control access to electronic collaboration content data (also referred to herein as content) associated with a plurality of organizations that each separately supports social network collaboration. An example system may include a collaboration platform having an identity aggregator, a content access manager and one or more databases configured to store the electronic collaboration content data associated with the plurality of organizations. The identity aggregator may receive an electronic request for access to the content from a client device of an individual over a communication network, and may determine an internal user identifier of the individual responsive to the electronic request. The internal user identifier represents an aggregate identity of the distinct corresponding organizational identity(s) of the individual among the organizations and/or external identity(s) of the individual among external content services. The content access manager may map the individual's internal user identifier to content permissions (e.g., read/write/share permissions) associated with the individual across each organization that is associated with the individual and the external content service(s) associated with the individual. The content access manager may permit access by the client device to at least a portion of the content stored among the one or more databases across each organization associated with the individual and based on the content permissions of the individual.

In some examples, the collaboration platform may be configured to create one or more virtual communities and/or one or more sub-communities. The collaboration platform may be configured to manage access to the virtual community(s) and/or sub-community(s) by member(s) and/or administrator(s), based on community access permissions (e.g., read/write/share permissions) associated with each member/administrator. The community access may include importation of content from organization(s) and/or external content service(s). The community access may also include authoring of content. In general, a virtual community represents a mechanism by which collaborative groups may import, create and share collaboration artifacts.

In some examples, the identity aggregator may be configured provide an authentication service to verify the identity of a user. In some examples, the identity aggregator may be configured to map multiple identities of an individual (e.g., organizational and/or external identities) and self-identify as the same individual through a one-time authentication of each individual identity. In some examples, the identity aggregator allows an individual with multiple electronic identities (e.g., organizational and/or external identities) to authenticate using any pair of identities and authentication methods (i.e., the identity aggregator allows single sign-on to the collaboration platform). The individual may then be permitted simultaneous access to content appropriate for all of the individual's multiple (individual) identities.

In general, an organization may include, without being limited to, a business, an association, or an institution supporting social network collaboration. For example, an organization may include a private branded social network service, a set of virtual communities and a member management system. An organization may permit collaboration privately within their own community of networks (i.e., intra-organizational collaboration) or may permit collaboration across an ecosystem of other organizations (i.e., inter-organizational collaboration).

In general, content may include, but is not limited to, private conversations, public conversations, electronic engagement, virtual communities, virtual sub-communities, blogs, electronic posts, electronic questions, electronic answers, electronic comments, electronic files, videos and/or electronic messaging.

According to aspects of the present disclosure, the collaboration platform may unify member identities across organizations, while allowing each organization to maintain its unique membership as a standalone entity. The platform may maintain privacy of content between organizations so that it is only available to the appropriate members.

An example collaboration platform may provide advantages of a private platform. For example, the platform may allow organizations to have uniquely addressable URLs and may allow organizations to apply their own brand to a user interface. The platform may also allow organizations to manage their membership and maintain ownership and privacy of the content within their organization.

An example collaboration platform may also provide the flexibility of a public platform. For example, content published on the platform may be freely searchable on third-party sites (e.g., Google™).

An example collaboration platform may also provide advantages of a hybrid private and public platform. For example, the platform may include a public component where members may collaborate within their trusted circles regardless of membership to their organization.

Collaboration platforms according to aspects of the present disclosure address the problem of supporting collaboration across organizations and hierarchies while allowing each organization control of their content, and shared control of shared content. Example collaboration platforms solve this problem by enabling cross-organization authoring of content and cross-organization searching of content, while providing access controls to content owners and their organizations. An example identity aggregator helps to solve this problem by its ability to logically map multiple logical identities in multiple different external systems for a single person.

It may be difficult to map multiple logical identities (that may include only limited or partial conceptual overlap) to a single logical identity. The identity aggregator solves this problem with an identity-aware mapping approach. The mapping determines a single unified identity that is the composite of the multiple individual (external) identifies. The union of external identifies may be incomplete or inexact (because the data associated with a single person in different external systems may be heterogeneous and/or not precisely convertible). In some examples, when the union of data is not convertible, each data may be kept and each data may be mapped to the particular external system. This allows the collaboration system to transparently interface with multiple external identity servers.

In some examples, a performance of the identity aggregator may be improved by caching key user data when applicable. The collaboration system may, thus, duplicate common identity fields from external identity servers. This may significantly improve a response time of the system as compared to dynamically query external servers for this data.

An example use of a collaboration platform, according to aspects of the present disclosure is described. Sue is a chief information officer (CIO) at a major healthcare organization. She is also a member of an association of healthcare CIOs. Her organization and the association of CIOs both use the platform for social collaboration. Her team is working on a project switching electronic health record vendors and moving to an entirely new system. She collaborates with her team on the platform. She is also able to draw from her peers in the CIO association on the same platform and even invite a couple of trusted advisors from her association peer group into a private community with her and a couple of her senior team members from within her organization. Her team has engaged directly with the vendor of the electronic health record system. The vendor is a member of a public host organization on the platform. Sue, her team, and her peers are also able to connect and collaborate directly with the vendor within the platform.

FIG. 1 is a functional block diagram illustrating an example social network collaboration system 100 (also referred to herein as system 100), according to aspects of the present disclosure. System 100 may include one or more client devices 102, collaboration platform 104, one or more identity servers 106 (e.g., identity servers 106-1, 106-2, 106-3) associated with respective private organizations (e.g., organizations A, B, C) and one or more public identity servers 108 associated with one or more public content services. Collaboration platform 104 may be configured to manage intra- and inter-organizational collaboration between client device(s) 102, organizations A-C and public (i.e., external) content services. Client device(s) 102, collaboration platform 104, identity server(s) 106 and public identity server(s) 108 may be communicatively coupled via network 110. Network 110 may include, for example, a private network (e.g., a local area network (LAN), a wide area network (WAN), intranet, etc.) and/or a public network (e.g., the Internet).

In one example, client device 102 may be represented by a computing device (such as computer system 1000 shown in FIG. 10), including a non-transitory memory (e.g., memory 1006 in FIG. 10) storing computer-readable instructions (i.e., collaboration application 112) executable by a processing device to perform the functions described herein. Client device 102 may be programmed via collaboration application 112 to access collaboration platform 104 via network 110. Client device 102 may include any suitable computing device configured to store collaboration application 112 and having user interface 114. User interface 114 may include any suitable interface, such as a device-specific user interface (e.g., a display, an interactive touch display, a keyboard, a pointing device, etc.) and/or a web portal user interface (e.g., a web page) for performing social collaboration according to the functions described herein. Execution of collaboration application 112 by a processor (e.g., processing device 1002 shown in FIG. 10) of client device 102 may cause client device 102 to be transformed into a specially-purposed device configured to perform the functions described herein, including control of user interface 114 for interaction with a user for social network collaboration via collaboration platform 104.

It should be understood that collaboration platform 104 refers to a computing system having sufficient processing and memory capabilities to perform the following functions, and it does not necessarily refer to a specific physical location. In certain embodiments, the computing system may be distributed over several physical locations, connected by one or more wired and/or wireless links. An example computing system that may represent collaboration platform 104 is described below with respect to FIG. 10. Similarly, each of identity server 106 and public identity server 108 generally refers to a computing system that may be distributed over one or several physical locations. In some examples, computing system 1000 (FIG. 10) may represent identity server 106 and/or public identity server 108.

Although FIG. 1 illustrates one client device 102, three identity servers 106-1, 106-2, 106-3 and one public identity server 108, it is understood that FIG. 1 represents an example embodiment of system 100, and that other arrangements of these elements are within the scope of the present disclosure. Thus, system 100 may include one or more client devices 104, one or more identity servers 106 and one or more public identity servers 108. Although FIG. 1 illustrates an example including private identity servers 106 and public identity server 108, in some examples, system 100 may include one or more private identity servers 106. In some of the examples below, access to content among private organizations A and B are described. It is understood that similar access to content may also be provided to public content services via public identity server(s) 108. Identity servers 106, 108 may, in general, contain and manage user identities and provide authentication for those users. In some examples, identity servers 106, 108 may also manage user groups. Examples of identity servers 106, 108 may include, without being limited to, Active Directory servers, Lightweight Directory Access Protocol (LDAP) servers and customer relationship management (CRM) systems.

Collaboration platform 104 may include identity aggregator (IA) 116, content access manager (CAM) 118 and one or databases (generally referred to as database(s) 120). Identity aggregator 116 may be configured to interface with external identity servers 106 and public identity server(s) 108, and to logically map multiple distinct identities for each user to a single internal user identifier. Content access manager 118 may be configured to map the internal user identifier for each user to corresponding content access rights, and may permit access to permitted content among database(s) 120 and/or external databases (via respective identity servers 106-1, 106-2, 106-3 and/or public identity server(s) 108). In some examples, components of platform 104 may be distributed over several physical locations, and may be implemented using a horizontally and vertically scalable server system. Tasks with a quick response time may be handled by a set of dedicated servers whereas background tasks may be handled by auxiliary servers.

A single user may have multiple identities, (e.g., with respect to different organizations, different hierarchical levels within an organization, with external public accounts, etc.). A logical identifier represents a user's identity within an organization or public content service source. Each logical identifier may also be associated with different access privileges (i.e., content access, content sharing, creation, deletion) both within and across organizations. In general, individuals can be members of multiple organizations and/or external content services.

Figure 2A:
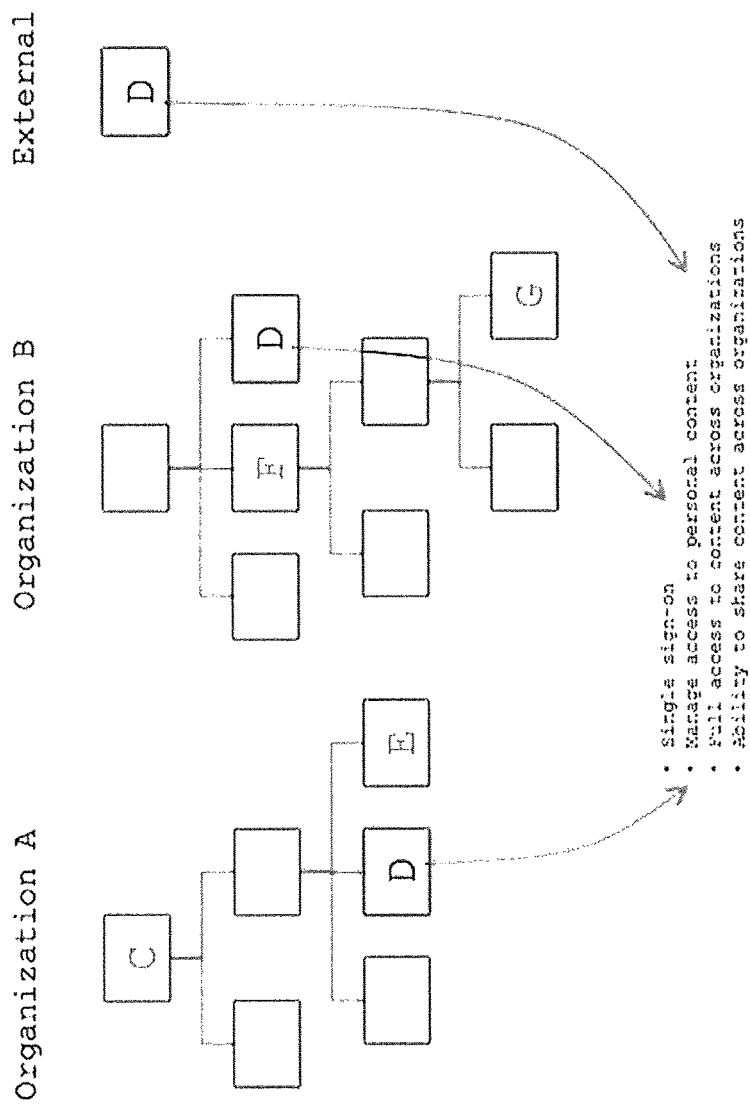
FIG. 2A is an example organization chart diagram illustrating membership of a single individual within multiple organizations and an external content service, according to an aspect of the present disclosure.

For example, FIG. 2A is an example organization chart diagram illustrating membership of a single individual within multiple organizations and an external service. In FIG. 2A, Individual D is a member of both Organization A and Organization B, and may have a separate and distinct organizational logical identity for each of Organizations A and B. Individual D may also have one or more separate and distinct external logical identities. The external identity may not be associated with either of Organizations A or B. Thus, individual D is a single person, but may include multiple distinct organizational and/or external logical identities. Although not shown, Individual D may include separate and distinct logical identities within the same organization (e.g., Organization A) associated with different hierarchical levels. In general, each distinct organizational/external identity may be associated with different organizational contexts and different content creation and access rights.

Referring back to FIG. 1, identity aggregator 116 may be configured to communicate with external identity server(s) 106 and public identity server(s) 108 as well as with client device(s) 102 via network 110, to manage the multiple logically distinct identities for each individual. During a registration process, identity aggregator 116 may map one or more organizational/external logical identities of a user to a single internal identity (also referred to herein as an internal user identifier). (The registration process is described further below with respect to FIG. 3). In some examples, identity aggregator 116 may consolidate the properties of multiple organizational/external logical identities of a user. Non-limiting examples of these properties may include identifying data such as email addresses, a date of birth (DOB), and phone numbers; and, in some examples, may include non-identifying data such as browser settings. Identity aggregator 116 may also be configured to pass authorization tokens between identity server(s) 106 and/or public identity server(s) 108 to enable single sign-on for individuals.

Identity aggregator 116 may include an application programming interface (API) for passing external security tokens to external identity servers 106, 108. Identity aggregator 116 may also include an API for exchanging user data with external identity servers 106, 108 (based on configuration data specifying how to interface with heterogeneous external identity servers 106, 108 and policies for data exchange). Identity aggregator 116 may also include an identity map that maps the multiple external identities to the single internal user identifier and an external metadata map that maps metadata of external identity servers 106, 108 to an internal schema.

Content access manager 118 may be coupled to identity aggregator 116, and may map the organizational/external identities of individuals that are managed by identity aggregator 116 (as a single internal user identity) to content permissions (i.e., content access rights, content authoring and content sharing permissions) across one or more organizational boundaries and external services.

Content access manager 118 may be coupled to database(s) 120, and control access to content among database(s) 120, dependent upon the content permissions for the user's internal identity. Accordingly, content access manager 118 may be logically positioned between content owned by multiple individuals and organizations. In some examples, database(s) 120 may include one or more non-relational structured query language (NoSQL) databases that may be both horizontally and vertically scalable. In one example, database(s) 120 may include root database (DB) 120-1, database 120-2 associated with organization A, database 120-3 associated with organization B and database 120-4 associated with organization C). Root database 120-1 may store the content permission mapping data for each user's internal identifier. It is understood that FIG. 1 represents an example arrangement of database(s) 120 and that other arrangements are possible. In some examples, database(s) 120 may include database 120-5 storing information for one or more logical communities.

Content access manager 118 may include an access map that maps internal user identifiers to cross-organizational access rights. Content access manager 118 may also include a lookup directory that indicates where content is stored (e.g., on internal database(s) or on an external organization's database).

In some examples, content access manager 118 may also include a set of rules for determining access to a specific item of content based on the access map. These rules may be configurable to support a range of content access policies. For example, content access manager 118 may cause the stored content in database(s) 120 to appear to be siloed (i.e., partitioned), fully integrated (i.e., full all-to-all access where all views of database(s) 120 may potentially access any item in any database 120), asymmetrical (e.g., DB A can access DB B, but DB B cannot access DB A), symmetrical, follow a logical hierarchy of organizations (e.g., DB A is a parent of DB B and all parent organizations can access child organization content), depend upon a relationship between organizations or any combination thereof, in which specific read/write/share permissions of content or collections of content may be configurable for each content item.

In some examples, database(s) 120 (that store the content associated with the different organizations, as illustrated in FIG. 1), may appear to be partitioned. Content access manager 118 may hides the specifics of the underlying physical database partitioning by overlaying the logical partitioning or integration as described above. Therefore, in some examples, it may not matter whether multiple physical databases 120 are partitioned or integrated from the perspective of organizations and individuals. In some examples, it may not matter whether physical databases 120 are owned by private organizations, a 3rd-party provider, or are publically available.

Database(s) 120 may include multiple collections of records. These records may include information relating to, without being not limited to, users (e.g., user information such as first and last name, address); communities (e.g., community information such as community name, access rights, members and administrator(s)); organizations (e.g., organization information such as name, members, default access rights); content (e.g., content such as files, posts, blogs, comments, etc.); external identity servers (e.g., information about external identity server(s) 106 and/or public identity server(s) 108 such as URLs and application programming interface (API) information); and user authorization (e.g., private key information of users that may be used by identify aggregator 116 to map a token provided by the user to the user's unique internal identifier).

As described herein, collaboration platform 104 may manage access to content for multiple individuals having multiple distinct organizational/external identities. An individual, via interaction with collaboration platform 104, may be permitted access to all of their respective content from among all of their associated organizations, as well as external sources (e.g., Facebook®) which may be available to the individual under a single sign-on aggregate (i.e., the internal user identifier). Platform 104 may provide individuals with a single sign-on experience, even across external accounts. Platform 104 may permit individuals the ability to retrieve/review/modify content for which they have associated access permissions. Platform 104 may also permit individuals the ability to share content across organizational boundaries (e.g., for both Organizations A and B). The control of access to content is described further below with respect to FIG. 5.

In operation, content access manager 118 may scan the content of external organization database(s) and/or public content database(s) (not shown). Based on this scanning, content access manager 118 may create new databases 120 and/or may expand its existing databases 120 in order to locally replicate key data, and add mapping data that defines the conceptual overlap between items in the various component DBs (e.g., DB A, DB B, etc.)

Content access manager 118 may also enable organizations and individuals to create and manage logical networked communities. In general, logical communities are a mechanism by which collaborative groups may import, create, and/or share collaboration artifacts.

Figure 2B:
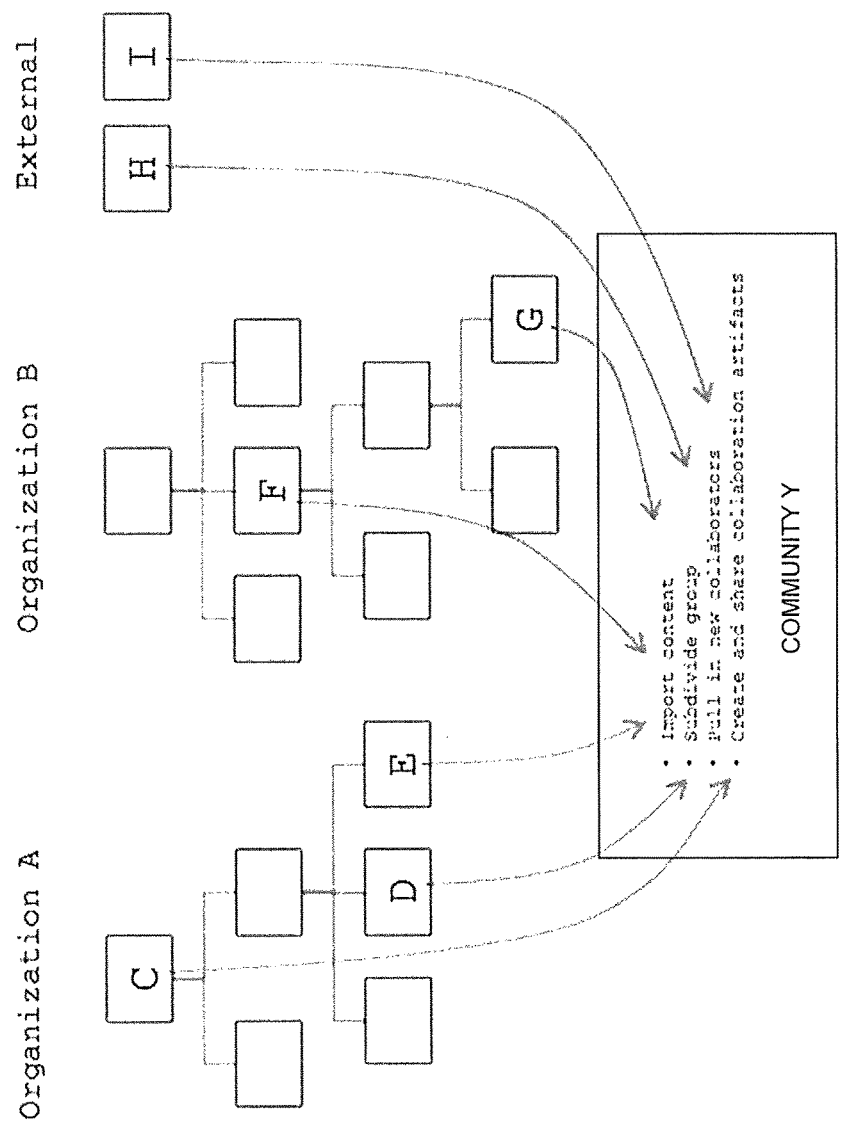
FIG. 2B is an example organization chart diagram illustrating a virtual community including multiple individuals across multiple organizations and external content services, according to an aspect of the present disclosure.

For example, FIG. 2B is an example organization chart diagram illustrating Community Y (also referred to herein as collaboration circle) including multiple individuals members C-I across multiple organizations (Organizations A and B) and external content services. In this example, Community Y consists of members across different hierarchy levels, across organizations, as well as external collaborators (e.g., H and I) who are not associated with either Organizations A or B.

Referring back to FIG. 1, content access manager 118, may map the internal user identifier of one or more users to one or more communities, as well as access permissions (e.g., read, write and/or share) for each community. Content access manager 118, via identity aggregator 116, may also obtain organizational content from among organizations and/or public content for inclusion in the community. Community creation and addition of organizational content via system 100 are described below with respect to FIGS. 7-9.

In general, collaboration platform 104 may manage the creation of one or more communities, access of individuals to communities, content modified by individuals in communities, and content added from (external) organizations and/or public sources. Collaboration platform 104 may, based on the individual's access permissions, allow members of a community to import content from the external databases of their parent organizations as well as publically-available content. Collaboration platform 104 may help members manage the membership and internal structure of their community (e.g., pull in new members or sub-divide the community into sub-communities, each of which can focus on specific subtasks). Collaboration platform 104 may also manage the artifacts of collaboration (i.e., content) produced by a community. Some of this content may be for internal use by members of the community or for one or more sub-communities. Other content may be shared to broader subsets of organizations (e.g., Organizations A and/or B), or public services (e.g., Facebook®). In some examples, content owned by a sub-community may be shared with members of the parent community.

Figure 2C:
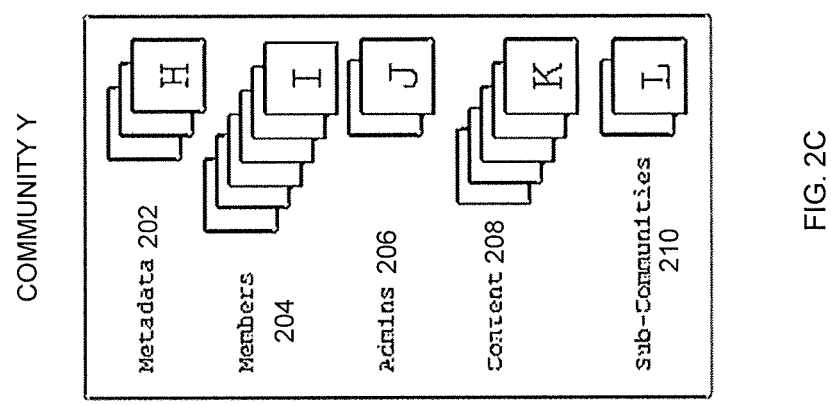
FIG. 2C is an example functional block diagram of an example virtual community managed by the collaboration system shown in FIG. 1, according to an aspect of the present disclosure.

FIG. 2C is a functional block diagram illustrating an example structure of logical Community Y. Information relating to Community Y may be stored in database 120-5 (FIG. 1). Community Y may include metadata 202, information regarding one or more individual members 204, information regarding one or more community administrators (admins) 206, content 208 and, optionally, information regarding one or more sub-communities 210. In some examples, Community Y may not include any items of content 208 (for example, when Community Y is initially created or if all items of content 208 are removed by one or more permissioned members 204 and/or administrator(s) 206). In general, a community may include zero or more items of content 208. In some examples, Community Y may not include any sub-communities 210. In general, a community may include zero or more sub-communities 210. Sub-communities 210 may be created within Community Y, for example, to further partition collaborating individuals around tasks, topic areas, virtual boundaries, etc. Metadata 202 may include, without being limited to, a community name, topic(s), mission(s), one or more content sharing rules, a map of relationships to other communities, etc.

Content 208 may include content imported from one or more external organizational databases and/or public content. Community members 204 and administrators 206 may, via platform 104, import external content from across hierarchy levels, organizations, personal and publically-available content to which they have access. The imported content may become part of content 208 associated with Community Y. Internal and external access to imported content may be managed by administrator(s) 206. Content 208 may also include new and/or modified content authored by members 204 and/or administrators 206 within Community Y. Access to newly created content within Community Y may be managed, via platform 104, by the (new content) authors and administrator(s) 206 of Community Y. Member(s) 204 and administrator(s) 206 may share content that has been imported into or created within the community across those organizations and/or public sources for which they have write permissions.

Communities may be configured such that any member may control content permissions or administrators (as opposed to members) can control the content permissions. Allowing members to control content permissions may be useful for collaborations in which all members have equal authority in deciding content permissions. Allowing administrators to control content permissions may be useful for collaborations in which privacy of the content is a high priority.

Content may be both managed by and associated with a community. One method for managing content with a logical community is to author the content within the community. However, other methods such as hash tags, keyword search, document clustering, user connection diagrams, may also be used to associate content with the logical community. However in these cases, content may not be managed by the community.

Platform 104 may provide a decentralized approach to community collaboration. Decentralized processing of social network tasks may significantly improve both computational efficiency and database response time compared to a centralized approach/processing. This is because platform 104 may effectively both prefetch and cache content that is managed by the logical community.

In some examples, platform 104 may also gather and store one or more metrics in database(s) 120. The metric(s) may be gathered, for example, as part of website operation. In some examples, the metric(s) may also be stored in a third party analytics data store (e.g., Google Analytics™). The metric(s) may be gathered as part of a monitoring process while a member uses a website of platform 104. For example, platform 104 may keep track of member logins and an active versus inactive rate for an organization (e.g., Organization A). Platform 104 may compare metrics for Organization A to the entire website or a comparable organization that is similar in terms of membership size, member demographics, location and other similar descriptive statistics.

In general, in addition to events like logins, platform 104 may track events related to user generated content. Examples of user generated content events may include, without being limited to, posts to the website, blogs, questions, answers, comments on content, feedback on content, likes of content, and sharing of content.

Platform 104 may monitor metrics (e.g., engagement activity) across system 100, in communities and within each organization. Platform 104 may provide these metrics to organizations that are part of system 100. Thus, each organization may be able to review the metrics, for example, for each of their own communities and compare and contrast metrics within them. In some examples, platform 104 may provide organizations with a high level visibility of engagement data of other organizations on platform 104 (e.g., to help organization better understand how they compare with other organizations). Accordingly, platform 104 may provide a detailed view of engagement across the entire system (including into each organization), and may help organizations on system 100 get the most and best possible use of system 100.

Those skilled in the art will appreciate that collaboration platform 104 may be configured to conduct the methods described herein with reference to FIGS. 3-7 and 9. As illustrated in FIGS. 3-7 and 9, each of the corresponding methods may be performed by processing logic (such as processing logic 1004 in FIG. 10) that may comprise hardware (e.g., circuitry, dedicated logic, programmable logic, microcode, etc.), software (such as instructions run on a processing device), or a combination thereof. In one embodiment, the methods shown in 3-7 and 9 may be performed by one or more processing components associated with identity aggregator 116 and content access manager 118 of collaboration platform 104.

In the description below regarding FIGS. 3-7 and 9, it is assumed that a user (User X) operates user interface 114 of client device 102 to communicate with IA 116 of platform 104 over network 110. Client device 102 may communicate with IA 116 via a web portal or a device application, by using specially purposed collaboration application 112 (i.e., specially purposed software instructions). Accordingly, collaboration application 112, stored in non-transitory memory on client device 102, may control operation of user interface 114 and communication with platform 104 via specific collaboration application 112. Collaboration application 112 may include software running in a web browser of client device 102 to control a web portal and/or may include a device application controlling a device-specific user interface 114.

Figure 3:
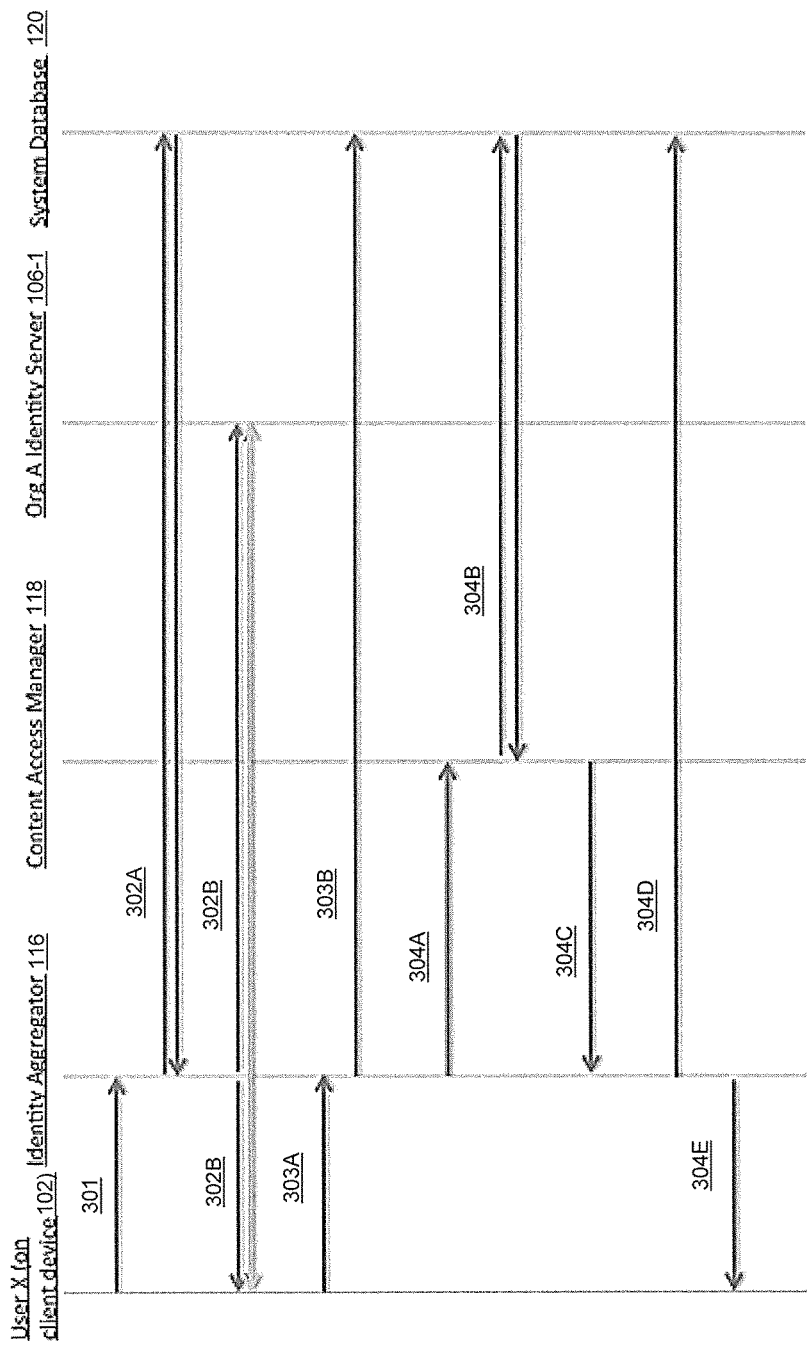
FIG. 3 is a signal flow diagram illustrating an example method of registering an individual with the collaboration system shown in FIG. 1, according to an aspect of the present disclosure.

FIG. 3 is a signal flow diagram illustrating an example method of registering an individual with collaboration system 100, according to an aspect of the present disclosure. In this example, a new member to system 100 (i.e., User X on client device 102) may request creation of an account via a web portal (or device application). In FIG. 3, it is assumed that User X is a member of organization A, and that Organization A has associated external identity server 106-1 that is registered with platform 104.

At step 301, User X may access IA 116 via a web portal (or device application) and may send a request to create an account. The request may specify that User X is using an external identity server. (It is assumed that platform 104 recognizes and supports the specified external identity server). For example, the request may specify organization identity server 106-1 of Organization A. During step 301, client-side collaboration application 112 that executes on the web portal (or device application) may connect to IA 116 over network 110 and send the request to IA 116. For example, application 112 may call a "Register User" API of IA 116 and forward the data in the request provided by User X.

At step 302A, IA 116 may query database(s) 120 for external identity server information, to determine the Internet address and particular API of identity server 106-1. IA 116 may use this data (i.e., address, API) to set up a secure tunnel between the web portal/device application of client device 102 and a login API for identity server 106-1.

At step 302B, IA 116 may set up the secure tunnel between client device 102 and the login API for identity server 106-1. (Indicated by the lighter gray arrow under step 302B). The secure tunnel may allow User X to directly and securely login to identity server 106-1 without revealing, to IA 116, knowledge of User X's external login/password. User X may then securely log in to identity server 106-1 via the secure tunnel. External identity server 106-1 then validates User X's access rights and returns a software security token, T1, to User X via an encrypted channel. Token T1 associated with an external organization (e.g., Organization A) is referred to herein as an external security token.

At step 303A, client device 102 (via collaboration application 112) forwards token T1 to IA 116. At step 303B, IA 116 sends external token T1 to database(s) 120 for storage. IA 116 may store T1 in a user authorization collection of database(s) 120 under an internal (i.e., system-wide unique user identifier or system-wide login name associated with User X. The token T1 is a software token generated by identity server 106-1, and indicates that identity server 106-1 has verified User X's external credentials. The software token may be generated by any suitable security token protocol, including, without being limited to shared secret architectures and public-key cryptography. IA 116 may use token T1 any time IA 116 accesses external information directly from Organization A, via identity server 106-1, on behalf of User X.

At step 304A, IA 116 may forward a remaining portion of data in the request (received from User X at step 301) to CAM 118. The remaining portion of data may include, for example, personal information of User X such as a first name, a last name, an avatar picture, etc.

At step 304B, CAM 118 may create a new user record for User X in database(s) 120, and may enter User X's data (received from IA 116 in step 304A) in the user's record. During step 304B, database(s) 120 may also create a system-wide unique user identifier (i.e., the internal user identifier) associated with User X, to identify User X within system 100. User X may also include a separate, external user identifier associated with Organization A. The external user identifier associated with Organization A may also be included in User X's user record (in database(s) 120), to indicate that User X is a member of Organization A. Database(s) 120 forwards User X's internal user identifier to CAM 118.

At step 304C, CAM 118 forwards User X's internal user identifier to IA 116. At step 304D, IA 116 may use the internal user identifier to generate an internal security token (T2), and a private key (PK1), using one of a number of known techniques such as public key encryption. IA 116 may store private key PK1 in database(s) 120).

At step 304E, IA 116 may send internal token T2 to client device 102 (i.e., to the web portal or device application). Responsive to the received internal token T2, client device 102 may include internal token T2 in all subsequent access requests to platform 104. User X, via client device 102, now has logical access to content as defined by organization A's content permission configurations. User X may renew the internal token T2 at any time by re-logging into system 100. As discussed further below, IA 116 may subsequently use private key PK1 to decrypt an internal token T2 received from client device 102 to result in User X's internal user identifier.

Figure 4:
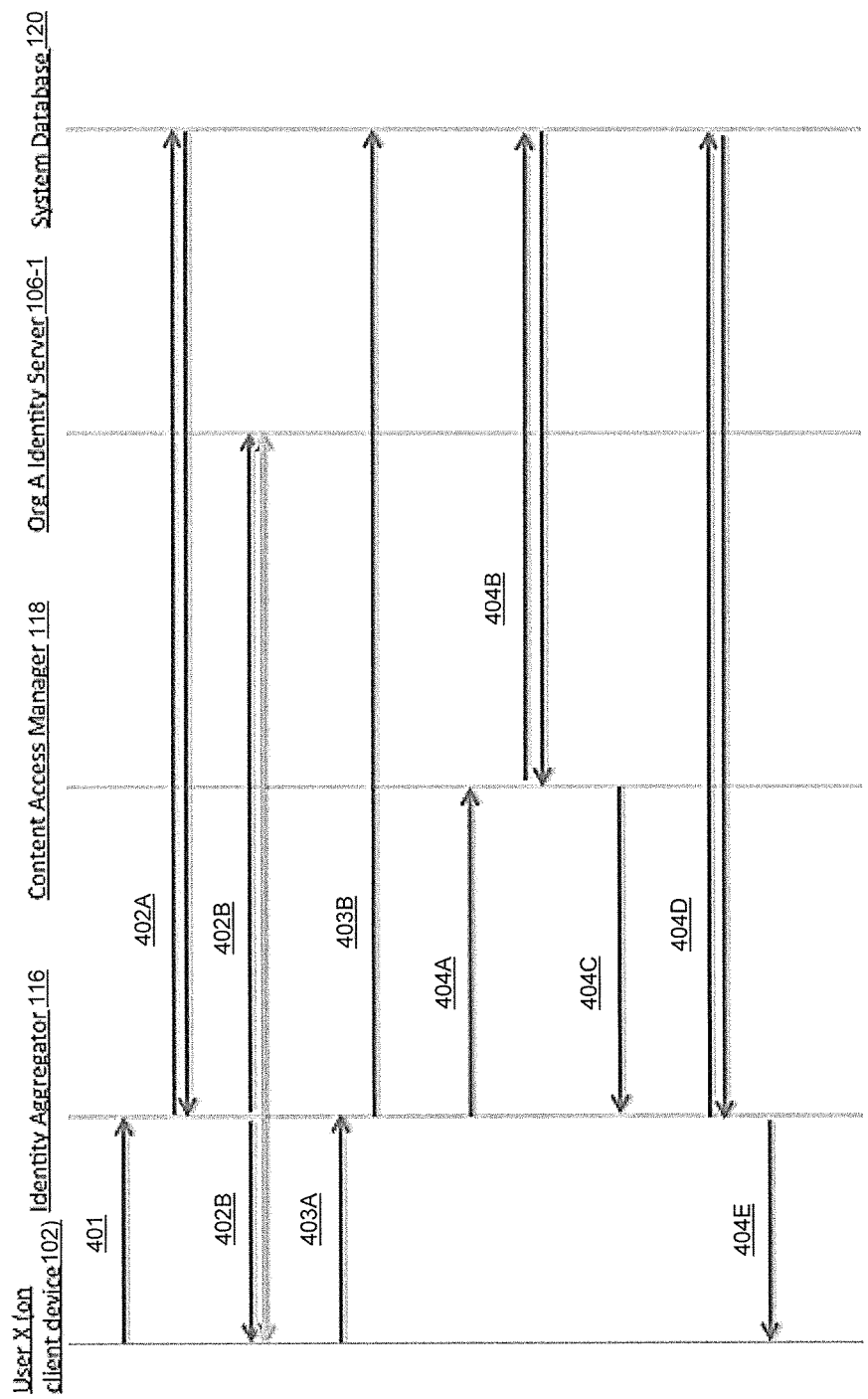
FIG. 4 is a signal flow diagram illustrating an example method of logging into the collaboration system shown in FIG. 1 by a previously registered individual, according to an aspect of the present disclosure.

FIG. 4 is a signal flow diagram illustrating an example method of logging into system 100 by previously registered User X via client device 102, according to an aspect of the present disclosure. At step 401, client device 102 (using a device application or a web portal on user interface 114) may send a login request to IA 116 via network 110. The login request may indicate that User X wants to log in using User X's credentials for Organization A. At step 402A, IA 116 queries database(s) 120 for the Internet address and login API of Organization A's identity server 106-1 (e.g., in an external identity server collection of database(s) 120).

At step 402B, IA 116 may set up a secure login tunnel between client device 102 and identity server 106-1 of Organization A. User X, via client device 102, may use the tunnel (illustrated by the lighter gray line) to log in securely to identity server 106-1. Identity server 106-1 then validates User X's access rights and returns an external software security token, T3 to User X via an encrypted channel.

At step 403A, client device 102 may forward external token T3 to IA 116. At step 403B, IA 116 may store external token T3 in database(s) 120 (e.g., a user authorization collection of database(s) 120). External token T3 may be used by IA 116 whenever IA 116 access information directly from organization A (via identity server 106-1) on behalf or user X. Receipt of external token T3 by IA 116 also indicates that the identity of User X for Organization A is verified.

At step 404A, because User X's identity is validated (based on step 403A), IA 116 may send a request to CAM 118 for User X's internal user identifier. The request to CAM 118 for the internal user identifier may include User X's system login name (e.g., User X's email address). At step 404B, CAM 118 may forward the request (from IA 116) to database(s) 120 (e.g., to a user information collection of database(s) 120). Database(s) 120 may then return User X's user record to CAM 118. At step 404C, CAM 118 may forward the internal user identifier of User X (retrieved from User X's record) to IA 116.

At step 404D, IA 116 may query database(s) 120 (e.g., user authentication collection in database(s) 120) for User X's private key. Responsive to the query from IA 116, database(s) 120 may send User X's private key PK1 to IA 116.

At step 404E, IA 116 may use User X's private key PK1 (obtained in step 404D) and internal user identifier (obtained in step 404C) to generate an internal security token, T4. IA 116 may then send internal token T4 to client device 102. Responsive to receipt of internal token T4, client device 102 may send all subsequent requests by User X to platform 104 with internal token T4.

In operation, client device 102 may send subsequent requests to CAM 118 (including internal token T4). Each request may be intercepted by IA 116. Each time (i.e., for each call from User X), IA 116 may decrypt the received token (using the private key PK1) and may forward the resulting internal user identifier to CAM 118 for further processing. Because IA 116 obtains the internal user identifier from the decrypted token (as opposed to receiving an internal user identifier), another user cannot directly enter User X's internal user identifier and masquerade as User X.

Figure 5:
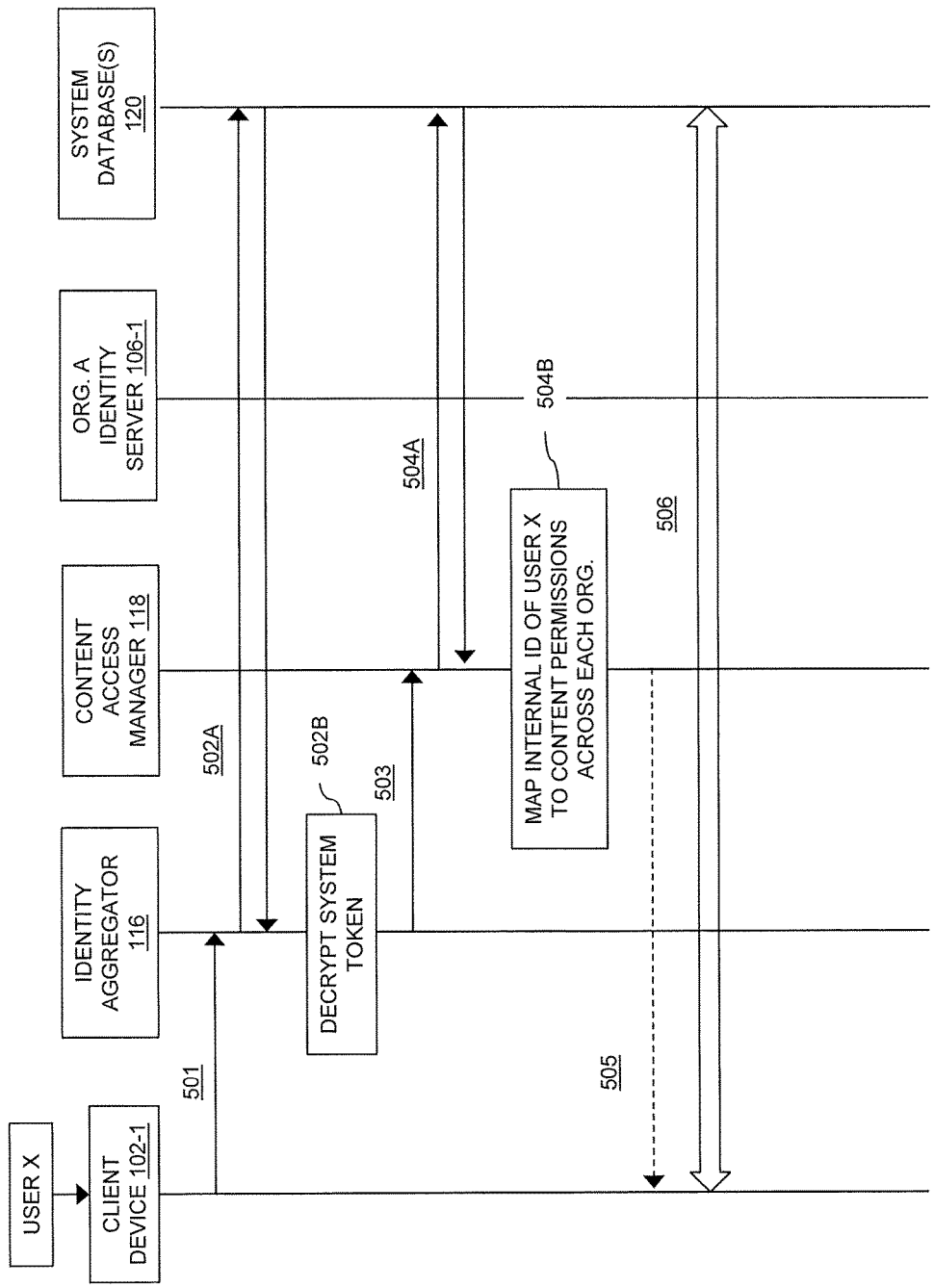
FIG. 5 is a signal flow diagram illustrating an example method of accessing content using the collaboration system shown in FIG. 1, according to an aspect of the present disclosure.

FIG. 5 is a signal flow diagram illustrating an example method of accessing content using system 100, according to an aspect of the present disclosure. FIG. 5 assumes that User X has previously registered and logged in, and has received a valid internal token (e.g., token T4). At step 501, client device 102 may send a request for access to content to IA 116, via network 110. (The request may be sent to CAM 118 but may be intercepted by IA 116. For convenience the request in step 501 is shown as being sent to IA 116). The access request may include previously provided internal token T4.

At step 502A, IA 116 may query database(s) 120 for User X's private key PK1, for example, based on User X's login name. Responsive to the query, database(s) 120 may return a private key PK1 associated with the login name. At step 502B, IA may 116 may decrypt the internal token T4 included in the access request (step 501), to obtain the internal user identifier that was previously assigned to User X.

At step 503, IA 116 forwards the decrypted internal user identifier to CAM 118 along with the access request (received by IA 116 step 501). At step 504A, CAM 118 uses the (decrypted) internal user identifier to access User X's user record in database(s) 120. CAM 118 may also obtain a database record from database(s) 120 that describes organization A and its content access policies. CAM 118 may use the information in User X's database record combined with information in Organization A's database record, to determine User X's access rights (e.g., if User X is a member of Organization A, and database(s) 120 contains certain content D that all members of Organization A are permissioned to access, then User X can access content D). The determination may be made using one of a number of known content permissions techniques (e.g., access control lists (ACLs), role-based access control (RBAC), group policy schemes, claims authorization approaches, etc.) Accordingly, at step 504B, CAM 118 may map User X's internal user identifier (ID) to content permissions for Organization A.

At optional step 505, if User X is not permissioned to access content, Cam 118 may send an error indication to client device 102 via network 110.

At step 506, if CAM 118 determines that there is content available for Organization A for which User X is permissioned to access, User X (via client device 102) may be permitted access to the permitted content in database(s) 120.

FIG. 5 illustrates an example of User X associated with one organization (Organization A). In some examples, User X may be associated with two or more organizations, as well as one or more public service sources of content. CAM 118 may map the internal user identifier to content permissions associated with multiple organizations and/or public source(s).

Accordingly, platform 104 may create an internal user identity when a user first registers with system 100. IA 116 allows a member to map multiple organizational/external identities together (via the internal user identifier) and self-identify as the same person through a one-time authentication to each individual identity. The logical organizational/external identities may remain intact in database(s) as separate entities.

For example, a first external user identity (e.g., john.doe@association.org) is created when User X's association signed up to use platform 104. Subsequently a second external user identity (e.g., john.doe@org.com) was created after User X's employer signed up to use platform 104. User X may log in to platform 104 using the second external user identity (john.doe@org.com) to aggregate his separate accounts into one account. To complete the process, User X provides appropriate sign on information for the first external user identity (john.doe@association.org). At this point, User X is able to log in as either identity and have access to the content available to both identities.

Figure 6:
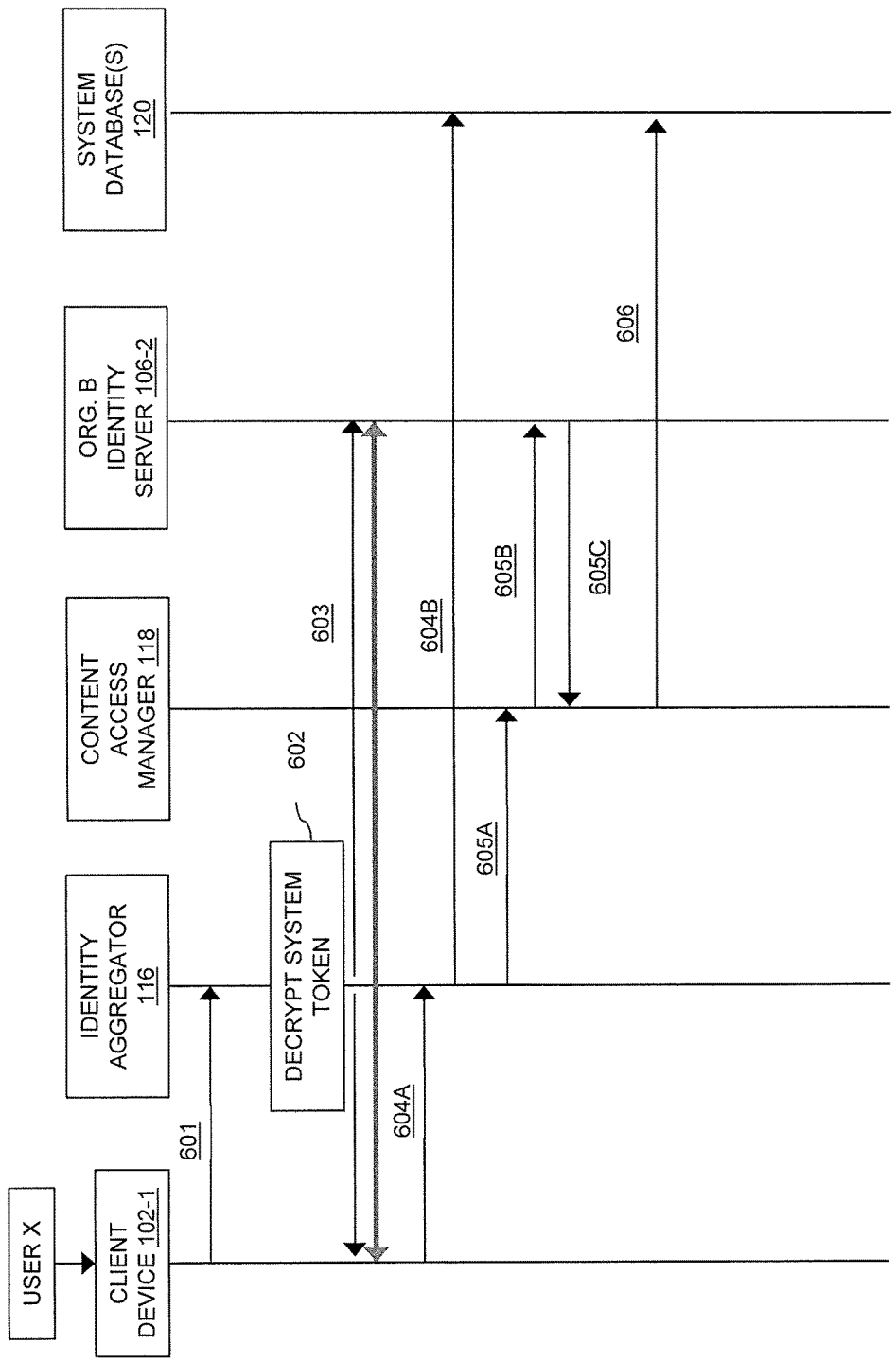
FIG. 6 is a signal flow diagram illustrating an example method of adding organizational information of another organization to the collaboration system shown in FIG. 1, according to an aspect of the present disclosure.

FIG. 6 is a signal flow diagram illustrating an example method of adding organizational information of another organization to system 100, according to an aspect of the present disclosure. In FIG. 6, it assumed that User X is previously registered and previously logged into system 100 with internal token T6. At step 601, User X sends a request to IA 116 to import data from identity server 106-2 associated with Organization B. The request may include internal token T6. For example, User X may use a web browser (via application 112) to select identity server 106-2 from among a list of a number of external identity servers known by system 100. The web browser, for example, may send the request to IA 116 along with internal token T6.

At step 602, IA 116 may verify internal token T6 and decrypt internal token T6 to obtain User X's internal user identifier. Although not shown, IA 116 may decrypt internal token T6 using the public key PK1 associated with User X. (See steps 502A and 502B in FIG. 5). Although not shown, IA 116 may query database(s) 120 for the Internet address and login API of Organization B's identity server 106-2 (see step 402A in FIG. 4).

At step 603, IA 116 may set up a secure login tunnel between client device 102 and identity server 106-2 of Organization B. User X, via client device 102, may use the tunnel to log in securely to identity server 106-2. Identity server 106-2 then validates User X's access rights and returns an external software security token, T7 to User X via an encrypted channel.

At step 604A, client device 102 may forward external token T7 to IA 116. At step 604B, IA 116 may store external token T7 in database(s) 120. Receipt of external token T7 by IA 116 indicates that the identity of User X for Organization B is verified.

At step 605A, IA 116 may forward User X's 'import data' request (step 601) to CAM 118 along with external token T7 and User X's internal user identifier. At step 605B, CAM 118 may use the received data to query external identity server 106-2, in order to obtain a URL and protocol required to query Organization B's data API. CAM 118 includes external token T7 (for organization B) in the request, in order to validate User X's identity to Organization B.

At step 605C, Organization B's data API, via identity server 106-2, returns User X's user profile to CAM 118 as well as the data from Organization B included in the import data request.

At step 606, CAM 118 may add a mapping to database(s) 120 (e.g., the user's collection within User X's main record). CAM 118 adds Organization B's external user identifier as a key to the mapping and the data returned by Organization B as the value in this mapping. Thus, User X's personal data that is imported from Organization B can be accessed by searching the user's collection first with user X's internal user identifier and then with Organization B's external user identifier.

Figure 7:
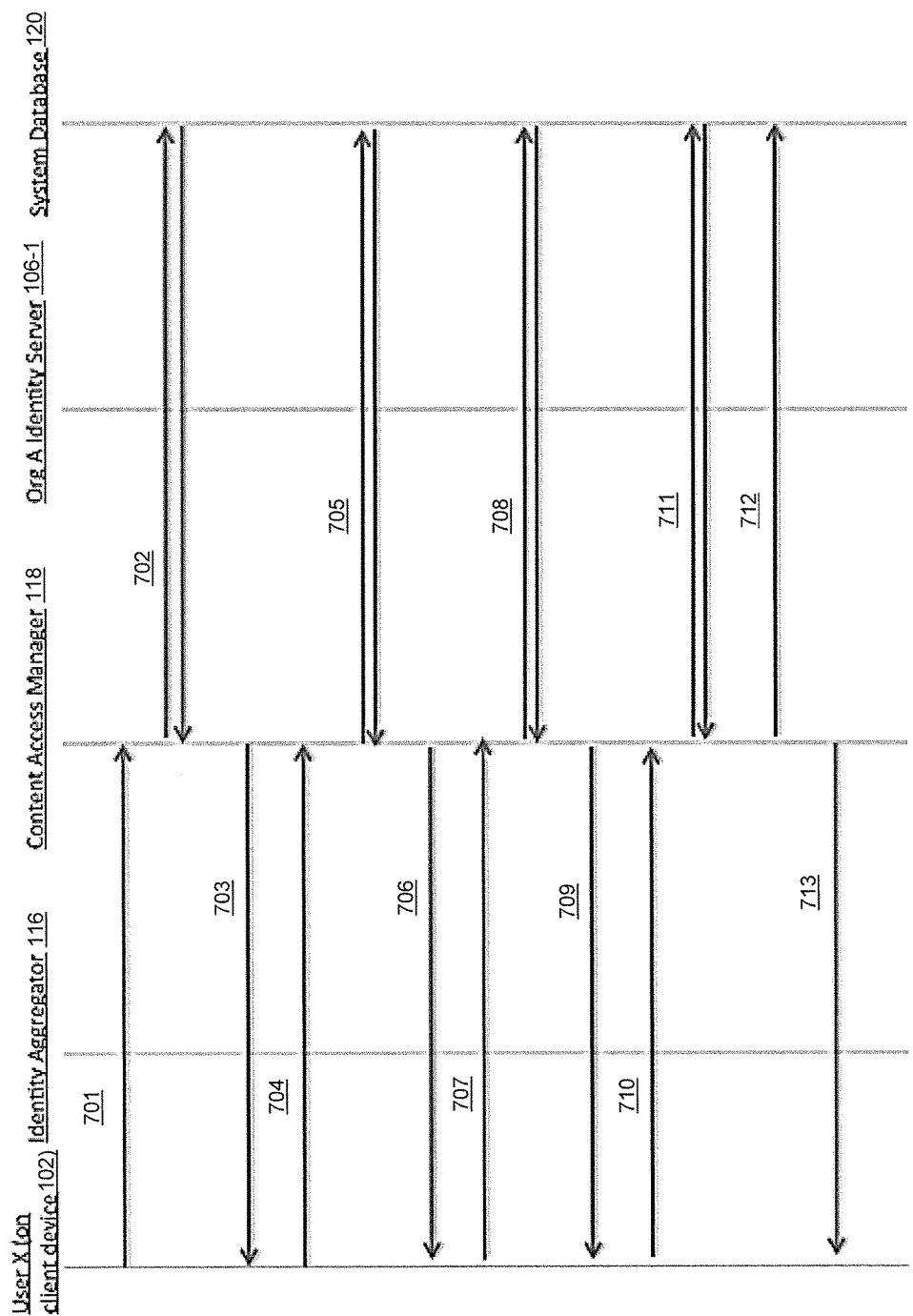
FIG. 7 is a signal flow diagram illustrating an example method of creating a virtual community and adding members to the community using the collaboration system shown in FIG. 1, according to an aspect of the present disclosure.
Figure 8B:
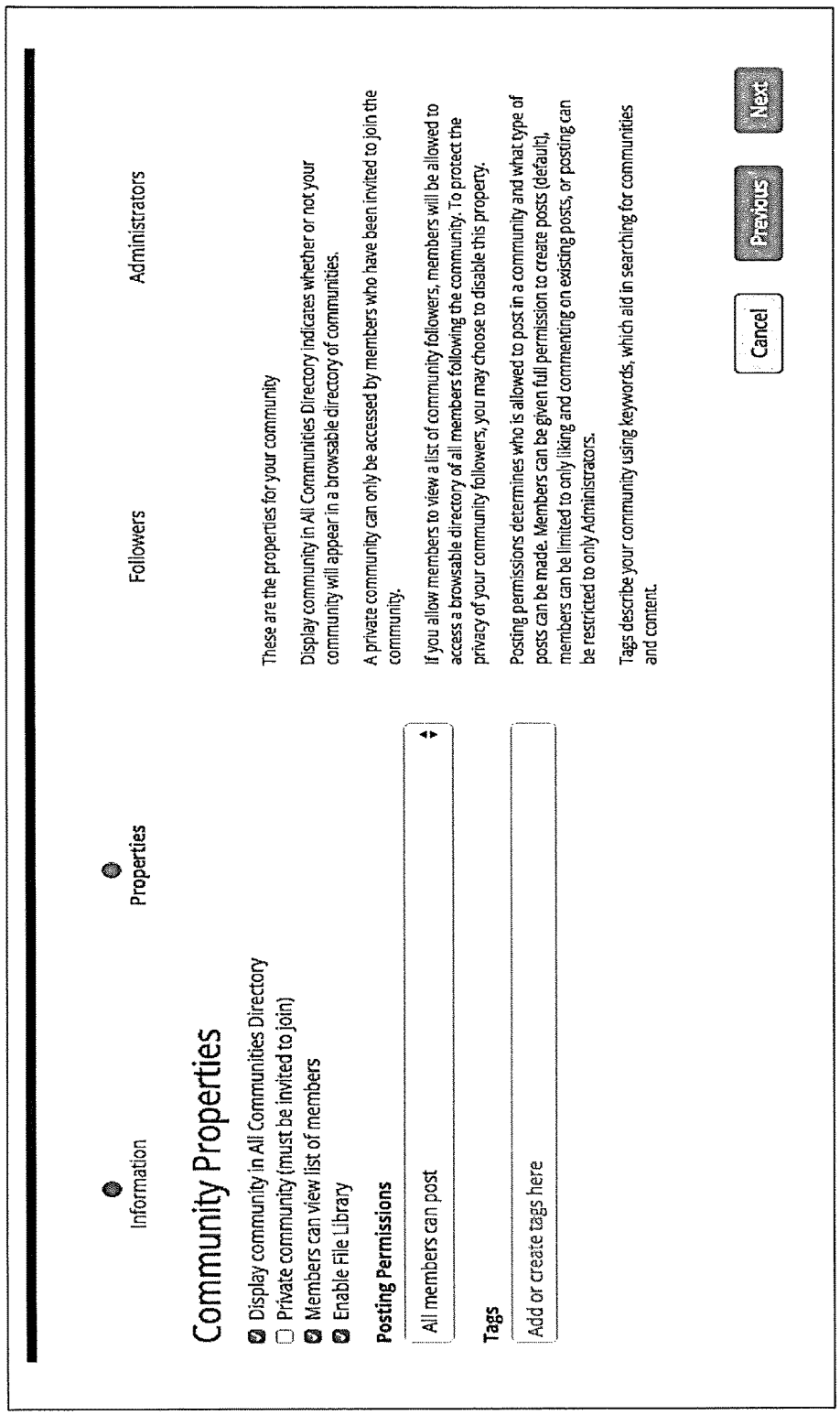
Figure 8C:
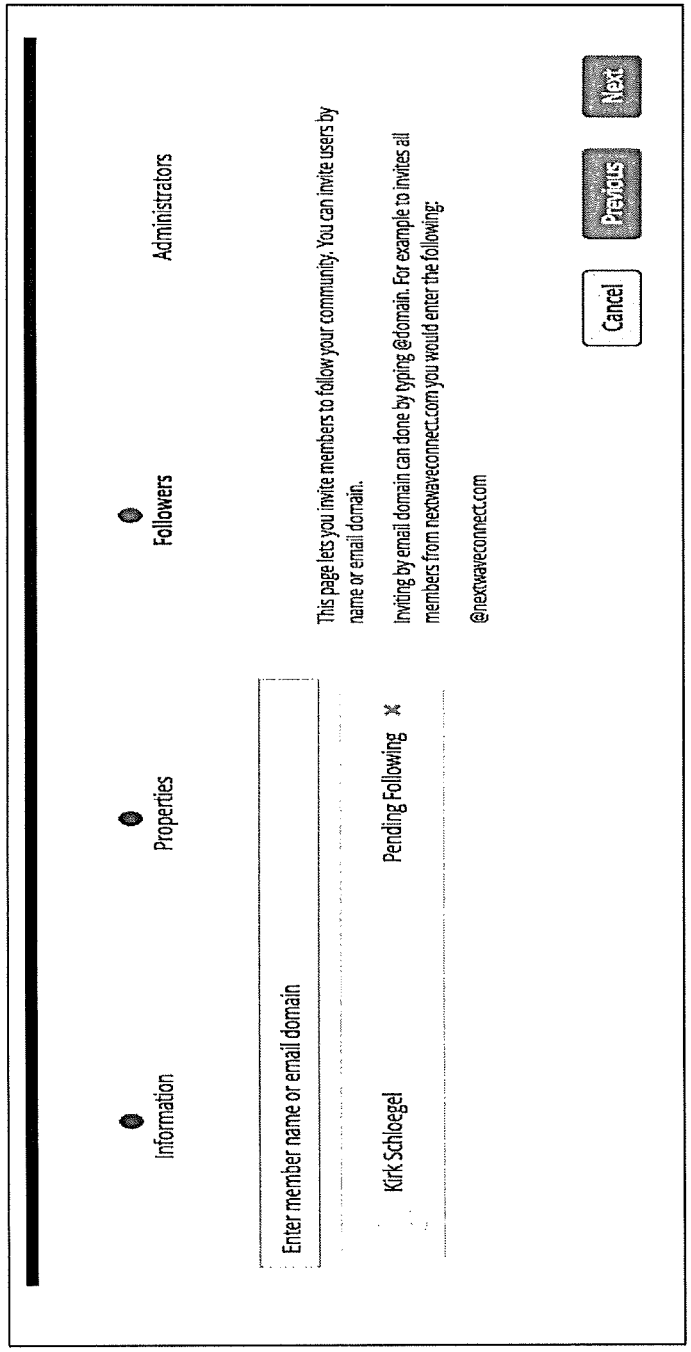
Figure 8D:
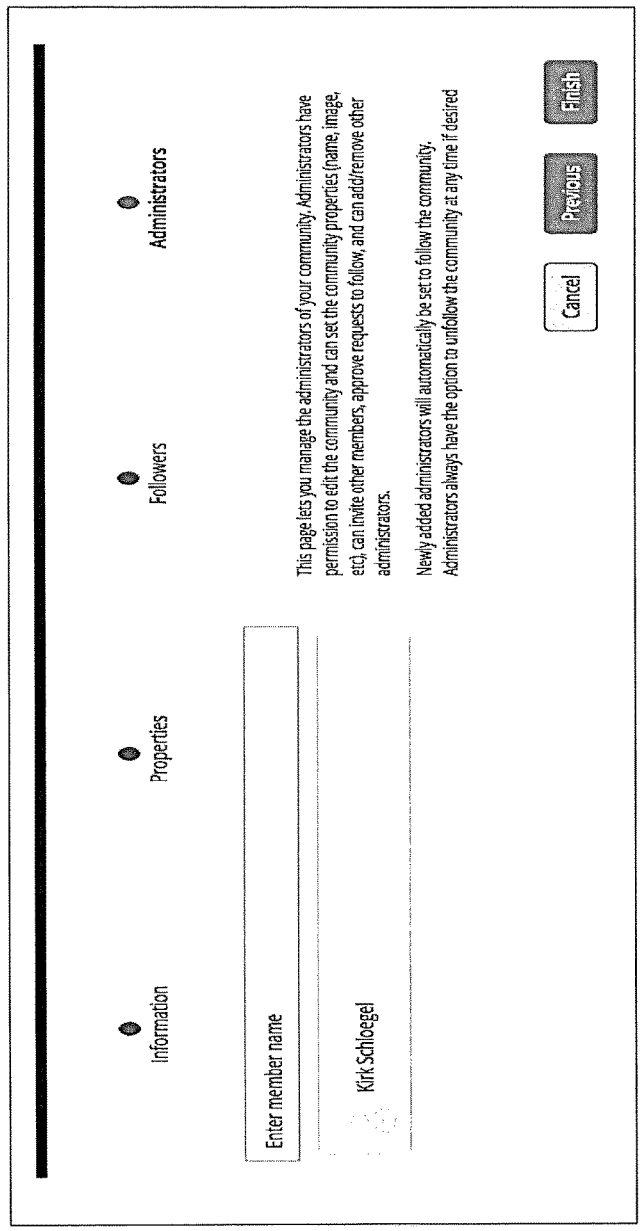

FIG. 7 is a signal flow diagram illustrating an example method of creating a community (e.g., Community Y) and adding members to the community by User X using system 100, according to an aspect of the present disclosure. In FIG. 7, it assumed that User X is previously registered and previously logged into system 100 and has received a valid internal token (e.g., internal token T4). FIG. 7 is described with respect to FIGS. 8A-8D. FIGS. 8A-8D are example screenshot images of graphical user interface 114 on client device 102, for creating and managing Community Y using system. In particular, FIG. 8A is an example new community creation form; FIG. 8B is an example community properties management form; FIG. 8C is an example member invite form; and FIG. 8D is an example administrator management form.

At step 701, client device 102 sends a request to CAM 118 to create a new community. The request may include the internal security token T4. For example, User X, using application 112 on a web browser of client device 102 may navigate to User X's collaboration "Home page." The "Home page" may include one or more links to web pages to add content or manage User X's settings, etc. User X may select a link to "Create a new Community." Application 112 may navigate to a "New Community Create Form" (e.g., such as shown in FIG. 8A) that provides a Wizard-like GUI to user interface 114 on client device 102. User X, via user interface 114, may fill out the requested information (and, in some examples, additional optional information) in the form, and may select a final 'Finish' button to create new Community Y. Application 112 running, for example, on a web browser of client device 102, may call CAM 118 to create Community Y, and may provide to CAM 118 all information input by User X into the new community creation form. Some of this information may specify content access settings for Community Y as specified by User X. For example, see FIG. 8B.

Although not shown in FIG. 7, IA 116 may intercept the call to CAM 118 (in step 701), and verify User X's internal identify from internal security token T4). These steps are shown, for example, in steps 502A and 502B of FIG. 5.

At step 702, CAM 118 may create a new community record in database(s) 120 (e.g., in a communities collection database) and may add the information provided by User X in step 701. CAM 118 may add information to Community Y's record that specifies User X's role in Community Y (for example, that User X may be an administrator of Community Y). During this process, database(s) 120 may create a new internal community identifier for Community Y. Database(s) 120 may return Community Y's internal community identifier to CAM 118. At step 703, CAM 118 may send a conformation message to client device 102 indicating success for creating Community Y. The confirmation message may include community Y's internal community identifier to application software 112 running on a browser or device application of client device 102.

At step 704, User X may send a request to CAM 118 to add new public members (and/or content) to Community Y, for example, via a web browser or device application. Because X, in this example, is now an administrator (or member) of Community Y, client application software 112 may provide a navigation link to Community Y that User X may easily access via user interface 114 (e.g., through a simple link or menu system). User X may use the navigation link to navigate to the Community Y page. In the background, client application software 112 may pass the request to CAM 118 and include Community Y's internal community identifier in the request. Although not shown, the request from client device 102 may be intercepted by IA 116. IA 116 may convert User X's internal token to User X's internal user identifier, and may forward the internal user identifier with the request to CAM 118.

At step 705, CAM 118 may query database(s) 120 (e.g., a communities collection database) using Community Y's internal community identifier as a key, and may verify that User X has access to Community Y. At step 706, when CAM 118 verifies that User X does have access (e.g., because User X is an administrator of Community Y), CAM 118 may respond to the request from client device 102 (step 704) with at least a subset of community Y's data that is available to an administrator (or member) of Community Y. For an administrator, this subset may include all the data. For a member, this subset of data may be less than or equal to all of the data. Client device 102, via user interface 114, may display the data to which User X has access. User X may select an "Edit Community" button that lets User X use user interface 114 to search for new members to add to Community Y. (See FIG. 8C).

At step 707, user interface 114 of client device 102 may receive user input from User X requesting an individual Z to be added as a new member of Community Y. For example, User X may enter a name or email domain of individual Z into the invite new member form indicated in user interface 114 (see FIG. 8C). Client device 102 may send the member request as a username search request to CAM 118.

At step 708, CAM 118 may query database(s) 120 (e.g., a user's database collection) for the name included in the username search request. Database(s) 120 may return, to CAM 118, one or more records of a matching list of users, including their internal user identifiers. At step 709, CAM 118 may forward the list to client device 102 and present the list to User X via user interface 114. For example, application 112 may use the received list to populate a dropdown list of users that can be selected by User X to be added to Community Y.

At step 710, User X selects, via user interface 114, individual Z. Application 112 may process this input by sending a request to CAM 118 to update Community Y's record by adding the internal user identifier of individual Z to the members list.

At step 711, CAM 118 confirms whether the requested operation may be performed by User X, by querying database(s) 120 (e.g., a collections database) for Community Y to determine whether User X is an administrator. When database(s) 120 responds to CAM 118 indicating that User X is an administrator of Y, CAM 118 performs the requested operation (at step 712), and updates the record of Community Y in the communities collection of database(s) 120. At step 713, CAM 118 may send an acknowledgement message to client device 102. For example, CAM 118 may cause a web browser of client device 102 to indicate a successful operation.

Although not shown, if database(s) 120 determine, at step 711, that the requested operation cannot be performed, database(s) 120 may send a message to CAM 118 that the operation cannot be completed. CAM 118 may then send a failure message to client device 102, indicating that the requested operation cannot be performed.

Instead of adding a new member to Community Y, User X could add a new item of content to Community Y (e.g., a short post, a file, a poll, a blog, etc.). Although not shown in FIG. 7, the process for adding content is similar to steps 704-711. However, for adding content, a new content record may be created in database(s) 120 (e.g., a Content collections database) instead of a new member record. In one example, this new content record may include Community Y's internal community identifier to specify the content that is owned by Community Y. In another example, the internal identifier of the new content record can be added to Community Y's content list.

Members (and administrators) may generally access (e.g., read) content of Community Y through communication with CAM 118, similar to the example of adding content. For example, the request sent to CAM 118 (and intercepted by IA 116 to obtain User X's internal user identifier) may include a request to read content owned by Community Y. CAM 188 may first determine whether User X has permission to read the content, by querying community content permissions, member lists, and administrator lists in database(s) 120. If User X does have permission to read the content, CAM 118 may search database(s) 120 (e.g., a content collection database) for all content owned by Community Y (i.e., content containing Community Y's internal community identifier in the record). CAM 118 may return this list of content to user interface 114 of client device 102. Administrator(s) may edit Community Y, set community properties (e.g., name, image, etc.), invite other members, approve requests to follow the community and add/remove other administrators, for example, via an administrator management form in a web browser on client device 102 (e.g., FIG. 8D).

Figure 9:
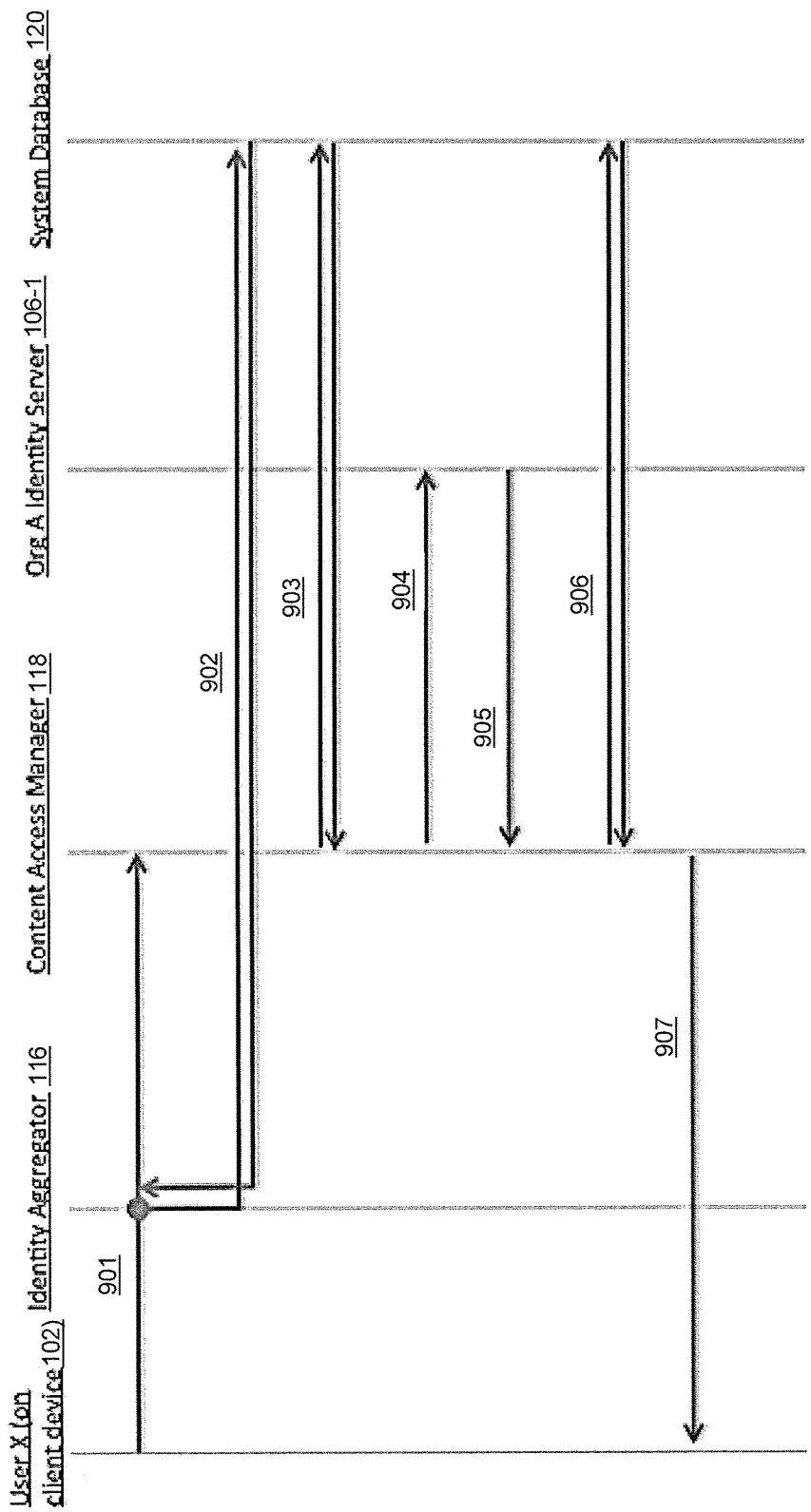
FIG. 9 is a signal flow diagram illustrating an example method of adding content from an organization to a virtual community using the collaboration system shown in FIG. 1, according to an aspect of the present disclosure.

FIG. 9 is a signal flow diagram illustrating an example method of adding content from an organization (e.g., Organization A) to a community (e.g., Community Y) using system 100, according to an aspect of the present disclosure. In FIG. 9, it assumed that User X is previously registered and previously logged into system 100 with internal token T6. It is also assumed that Community Y has previously been created and that User X is a member of Community Y.

At step 901, client device 102 of User X may send a request to CAM 118 to add content from external Organization A to Community Y. The request (at step 901) may include the internal token T6. For example, User X may indicate the request to add content from an external organization (or a public service) via a local browser window on user interface 114. Application 112 on client device 102 may provide a form on user interface 114 in which User X may specify the URL of the content to be imported. Application 112 on client device 102 may then send the request (including the information indicated by User X) to CAM 118. In this example, it is assumed that User X is still logged into Organization A and that an external token T3 associated with User X and Organization A has not yet expired. In case the external token T3 has expired, User X may re-log into Organization A to obtain a new external token, T5.

At step 902, the add external content request (in step 901) may be intercepted by IA 116 and the internal token T6 may be used by IA 116 to obtain and verify User X's internal user identifier (see FIG. 5). Because the add external content request indicates that data from external Organization A is requested, IA 116 may take additional actions. For example, IA 116 may retrieve external token T3 associated Organization A (and User X) from database(s) 120 (e.g., a user authorization collection database) using User X's internal user identifier as a key. IA 116 may add external token T3 to the add external content request (step 901) sent to CAM 118.

At step 903, CAM 118 may retrieve Organization A's identity server API data from database(s) 120 (e.g., an external identity server collection database). At step 904, CAM 118 may use the API data and external token T3 to forward the add external content request (step 901) to Organization A's identity server 106-1.

At step 905, Organization A's data API may respond to CAM 118, via identity server 106-1, with the requested data or with an error status. A data structure used between CAM 118 and Organization A's data API may include any suitable data structure format, including, without being limited to, JavaScript Object Notation (JSON), Extensible Markup Language (XML), etc.).

If the request is unsuccessful, (i.e., Organization A's data API returns an error status message at step 905), CAM 118 may forward an error message user interface 114 of client device 102 (not shown).

At step 906, if the request is successful (based on step 905), CAM 118 may add the external data received from Organization A to Community Y's content, by creating new records in database(s) 120 (e.g., a content collection database). Community Y's internal identifier may be added to this new record to specify that this new content is owned by Community Y. At step 907, CAM 118 may update User X's local browser on user interface 114 with Organization A data, so that User X is provided with visual confirmation of the imported data and local access to further edit this content.

Systems and methods of the present disclosure include and/or are implemented by one or more computers including hardware and/or software components. For purposes of this disclosure, a computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, personal computers (PCs), mobile devices, and other terms. It will be understood by those of ordinary skill that those terms used herein are interchangeable, and any special purpose computer capable of performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

Figure 10:
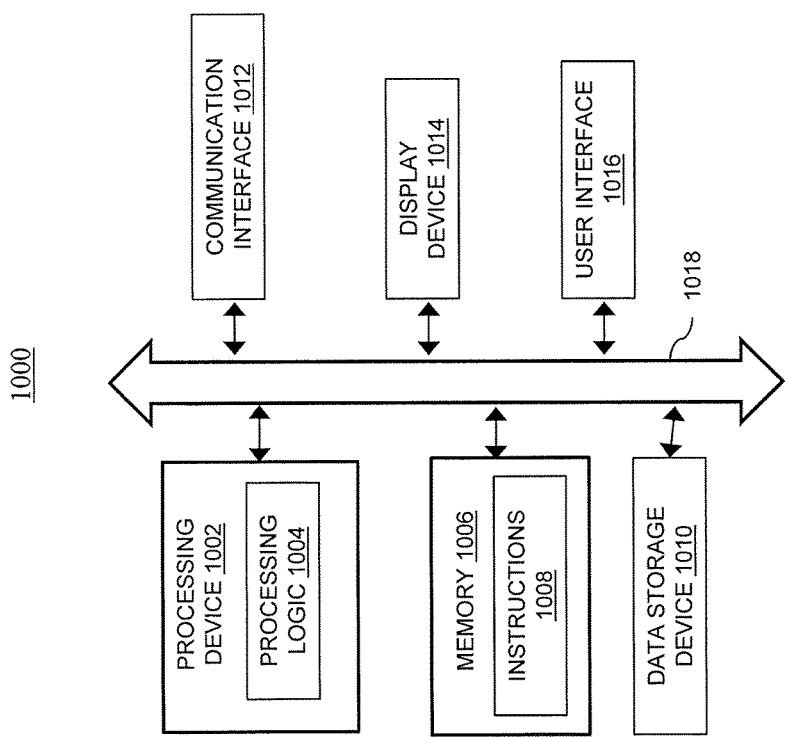
FIG. 10 is a functional block diagram of an example computer system, according to an aspect of the present disclosure.

FIG. 10 illustrates a functional block diagram of a machine in the example form of computer system 1000 within which a set of instructions for causing the machine to perform any one or more of the methodologies discussed herein, may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, platform 104 (FIG. 1) may be implemented by the example machine shown in FIG. 10 (or a combination of two or more of such machines). In some examples, client device 102 (FIG. 1) may be implemented by the example machine shown in FIG. 10.

Example computer system 1000 may include processing device 1002, memory 1006, data storage device 1010 and communication interface 1012, which may communicate with each other via data and control bus 1018. In some examples, computer system 1000 may also include display device 1014. In some examples, computer system 1000 may include user interface 1016.

Processing device 1002 may include, without being limited to, a microprocessor, a central processing unit, an application specific integrated circuit (ASIC), a field programmable gate array (FPGA), a digital signal processor (DSP) and/or a network processor. Processing device 1002 may be configured to execute processing logic 1004 for performing the operations described herein. In general, processing device 1002 may include any suitable special-purpose processing device or a processing device specially programmed with processing logic 1004 to perform the operations described herein.

Memory 1006 may include, for example, without being limited to, at least one of a read-only memory (ROM), a random access memory (RAM), a flash memory, a dynamic RAM (DRAM) and a static RAM (SRAM), storing computer-readable instructions 1008 executable by processing device 1002. In general, memory 1006 may include any suitable non-transitory computer readable storage medium storing computer-readable instructions 1008 executable by processing device 1002 for performing the operations described herein. Although one memory device 1006 is illustrated in FIG. 10, in some examples, computer system 1000 may include two or more memory devices (e.g., dynamic memory and static memory).

Computer system 1000 may include communication interface device 1012, for direct communication with other computers (including wired and/or wireless communication) and/or for communication with network 110 (FIG. 1). In some examples, computer system 1000 may include display device 1014 (e.g., a liquid crystal display (LCD)). In some examples, computer system 1000 may include user interface 1016 (e.g., an alphanumeric input device, a touch sensitive display, a cursor control device, a loudspeaker, etc.).

In some examples, computer system 1000 may include data storage device 1010 storing instructions (e.g., software) for performing any one or more of the functions described herein. Data storage device 1010 may include any suitable non-transitory computer-readable storage medium, including, without being limited to, solid-state memories, optical media and magnetic media.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present invention.

The invention claimed is:

1. A system for controlling access to electronic collaboration content data associated with a plurality of organizations that each separately support social network collaboration, the system comprising:
   a collaboration platform comprising a non-transitory memory storing computer readable instructions and a processor configured to execute said instructions, the collaboration platform including:
      an identity aggregator configured to receive an electronic request for access to the electronic collaboration content data from a client device of an individual over a communication network, the electronic request including an encrypted internal token associated with the collaboration platform, the identity aggregator configured to determine an internal user identifier of the individual responsive to the electronic request based on decryption of the encrypted internal token, the internal user identifier comprising a single unified identity of the individual that is a composite of multiple individual identities and representing an aggregate identity of the individual corresponding to at least one of one or more organizational identities of the individual among the plurality of organizations or one or more external identities of the individual among one or more external content services;
      a content access manager configured to map the internal user identifier of the individual to content permissions associated with the individual across each organization among the plurality of organizations that is associated with the individual and the one or more external content services associated with the individual; and
      one or more internal databases associated with the collaboration platform configured to collect and store the electronic collaboration content data associated with the plurality of organizations,
   wherein the content access manager permits, by the client device, over the communication network, access to a particular portion of the electronic collaboration content data stored among the one or more internal databases across each organization associated with the individual and based on the content permissions of the individual according to the internal user identifier.

2. The system of claim 1, wherein the content permissions include at least one of a read content permission, a write content permission, or a share content permission.

3. The system of claim 1, wherein each organizational identity is associated with at least one of a different organization, a different hierarchical level within a same organization, different cross-hierarchy content permissions or different cross-organization content permissions.

4. The system of claim 1, wherein the electronic collaboration content data includes at least one of an electronic file, a video, an electronic post, an electronic message, an electronic question, an electronic answer, a blog, an electronic comment, a private conversation, a public conversation, an electronic engagement, a virtual community or a virtual sub-community.

5. The system of claim 1, wherein the content access manager configures the one or more internal databases to store the electronic collaboration content data in a predetermined configuration associated with data access across the plurality of organizations, the predetermined configuration including at least one of a partitioned configuration, an integrated configuration, an asymmetrical configuration, a symmetrical configuration, a logical hierarchy configuration or a configuration based on a predetermined relationship among the plurality of organizations.

6. The system of claim 1, wherein the content access manager is configured to create at least one virtual community having one or more members and configured to store one or more electronic items of content associated with the community in the one or more internal databases, the content access manager configured to map each member to respective community access permissions.

7. The system of claim 6, wherein the community access permissions, for each member, include at least one of a read permission, a write permission, a share permission or access permission of at least one of imported or authored content or external access permission.

8. The system of claim 6, wherein the content access manager is configured to receive, from the client device of the individual over the communication network, a request to access the at least one virtual community, the content access manager permitting the client device to access the at least one virtual community based on the community access permissions associated with the individual.

9. The system of claim 6, wherein the content access manager is configured to create one or more sub-communities within the at least one virtual community.

10. The system of claim 1, wherein the content access manager is configured to communicate, over the communication network, with an external identity server associated with one among the plurality of organizations and the one or more external content services to import content into the one or more internal databases, based on a respective identity among the one or more organizational identities and the one or more external identities of the individual.

11. The system of claim 1, wherein the identity aggregator is configured to communicate, over the communications network with an external identity server associated with one among the plurality of organizations and the one or more external content services, and establish a secure tunnel between the external identity server and the client device, to cause the client device to login to the external identity server via the collaboration platform.

12. The system of claim 1, wherein the encrypted internal token comprises a security token, the identity aggregator being configured to determine, prior to the electronic request for access, the security token and a private key associated with the individual, based on the internal user identifier of the individual, and to send the security token to the client device over the communication network.

13. The system of claim 12, wherein the electronic request for access includes the security token associated with the individual, and the identity aggregator determines the internal user identifier by decrypting the security token received in the electronic request using the private key associated with the individual.

14. The system of claim 1, wherein the collaboration platform is configured to capture one or more metrics associated with social network collaboration by one or more client devices via the collaboration platform, the social network collaboration including at least one of intra-organizational collaboration, or inter-organizational collaboration.

15. A computer-implemented method for controlling access to electronic collaboration content data associated with a plurality of organizations that each separately support social network collaboration, the method comprising:
   storing, in one or more internal databases associated with a collaboration platform, the electronic collaboration content data collected from and associated with the plurality of organizations;
   receiving, by an identity aggregator of the collaboration platform, over a communication network, an electronic request for access to the electronic collaboration content data from a client device of an individual, the electronic request including an encrypted internal token associated with the collaboration platform;
   determining, by the identity aggregator, an internal user identifier of the individual responsive to the electronic request based on decryption of the encrypted internal token, the internal user identifier comprising a single unified identity of the individual that is a composite of multiple individual identities and representing an aggregate identity of the individual corresponding to at least one of one or more organizational identities of the individual among the plurality of organizations or one or more external identities of the individual among one or more external content services;
   mapping, by a content access manager of the collaboration platform, the internal user identifier of the individual to content permissions associated with the individual across each organization among the plurality of organizations that is associated with the individual and the one or more external content services associated with the individual; and
   permitting, by the content access manager, the client device to access, over the communication network, a particular portion of the electronic collaboration content data stored among the one or more internal databases across each organization associated with the individual and based on the content permissions of the individual according to the internal user identifier.

16. The method of claim 15, the method further comprising:
   creating, by the content access manager, at least one virtual community having one or more members and configured to store one or more electronic items of content associated with the community in the one or more internal databases; and
   mapping, by the content access manager, each member to respective community access permissions.

17. The method of claim 16, the method further comprising:
   receiving, by the content access manager, from the client device of the individual over the communication network, a request to access the at least one virtual community; and
   permitting, by the content access manager, the client device to access the at least one virtual community, responsive to the request, based on the community access permissions associated with the individual.

18. The method of claim 16, the method further comprising:
   creating, by the content access manager, one or more sub-communities within the at least one virtual community.

19. The method of claim 15, the method further comprising:
   communicating, by the content access manager, over the communication network, with an external identity server associated with one among the plurality of organizations and the one or more external content services to import content into the one or more internal databases, based on a respective identity among the one or more organizational identities and the one or more external identities of the individual.

20. The method of claim 15, the method further comprising:
   communicating, by the identity aggregator, over the communications network with an external identity server associated with one among the plurality of organizations and the one or more external content services, to establish a secure tunnel between the external identity server and the client device; and
   causing the client device to login to the external identity server via the collaboration platform using the secure tunnel.

21. The method of claim 15, wherein the electronic collaboration content data includes at least one of an electronic file, a video, an electronic post, an electronic message, an electronic question, an electronic answer, a blog, an electronic comment, a private conversation, a public conversation, an electronic engagement, a virtual community or a virtual sub-community.

22. A non-transitory computer-readable storage medium programmed to include instructions that, when executed by one or more processing devices, cause the one or more processing devices to perform functions including:
   storing, in one or more internal databases associated with the one or more processing devices, electronic collaboration content data collected from and associated with a plurality of organizations that each separately support social network collaboration;
   receiving, over a communication network, an electronic request for access to the electronic collaboration content data from a client device of an individual, the electronic request including an encrypted internal token associated with the one or more processing devices;
   determining an internal user identifier of the individual responsive to the electronic request based on decryption of the encrypted internal token, the internal user identifier comprising a single unified identity of the individual that is a composite of multiple individual identities and representing an aggregate identity of the individual corresponding to at least one of one or more organizational identities of the individual among the plurality of organizations or one or more external identities of the individual among one or more external content services;
   mapping the internal user identifier of the individual to content permissions associated with the individual across each organization among the plurality of organizations that is associated with the individual and the one or more external content services associated with the individual; and permitting the client device to access, over the communication network, a particular portion of the electronic collaboration content data stored among the one or more internal databases across each organization associated with the individual and based on the content permissions of the individual according to the internal user identifier.

\* \* \* \* \*